(12) United States Patent
Sheng

(10) Patent No.: US 10,409,635 B2
(45) Date of Patent: Sep. 10, 2019

(54) SWITCHING METHOD, SWITCHING SYSTEM AND TERMINAL FOR SYSTEM AND/OR APPLICATION PROGRAM

(71) Applicant: DONGGUAN YULONG TELECOMMUNICATION TECH CO., LTD., Guangdong (CN)

(72) Inventor: Jingen Sheng, Guangdong (CN)

(73) Assignee: DONGGUAN YULONG TELECOMMUNICATION TECH CO., LTD., Guangdong (CN)

(*) Notice: Subject to any disclaimer, the term of this patent is extended or adjusted under 35 U.S.C. 154(b) by 169 days.

(21) Appl. No.: 15/448,803

(22) Filed: Mar. 3, 2017

(65) Prior Publication Data

US 2017/0177405 A1 Jun. 22, 2017

Related U.S. Application Data

(63) Continuation of application No. PCT/CN2014/092616, filed on Nov. 29, 2014.

(30) Foreign Application Priority Data

Sep. 28, 2014 (CN) .......................... 2014 1 0513749

(51) Int. Cl.
*G06F 9/46* (2006.01)
*G06F 9/48* (2006.01)
(Continued)

(52) U.S. Cl.
CPC ................ *G06F 9/48* (2013.01); *G06F 9/542* (2013.01); *H04M 19/04* (2013.01); *G06F 2209/482* (2013.01)

(58) Field of Classification Search
CPC ....... G06F 9/48; G06F 9/542; G06F 2209/482
See application file for complete search history.

(56) References Cited

U.S. PATENT DOCUMENTS 6,615,356 B1* 9/2003 Byun ...................... G06F 21/31
    710/100
9,565,459 B2* 2/2017 Barton ............. H04N 21/47202
(Continued)

FOREIGN PATENT DOCUMENTS

| CN | 102438062 | 5/2012 |
| CN | 103150209 | 6/2013 |
| CN | 103780753 | 5/2014 |

OTHER PUBLICATIONS

Translated International Search Report PCT/ISA/210, International Application No. PCT/CN/2014/092616, pp. 1-2, International Filing Date Nov. 29, 2014, mailing date of search report dated Jun. 24, 2015.

*Primary Examiner* — Camquy Truong
(74) *Attorney, Agent, or Firm* — Bond Schoeneck & King, PLLC; George R. McGuire

(57) ABSTRACT

Provided are a method and terminal for switching systems and/or application programs. The method includes: receiving a notification and/or event from a second system and/or application during the operation process of a first system and/or application program, and then switching to the second system and/or application program; when it is determined that the notification and/or event is ended, judging whether running processes of all systems and/or application programs in the second system and/or application program are ended; when it is determined that the running process of any one of system and/or application program is not ended, switching to the one of system and/or application program, when it is determined that the running processes of all of systems and/or applications are ended, switching to the first system and/or application program.

15 Claims, 4 Drawing Sheets

(51) Int. Cl.
*G06F 9/54* (2006.01)
*H04M 19/04* (2006.01)

(56) References Cited

U.S. PATENT DOCUMENTS

2007/0011462 A1* 1/2007 Lee .................. G06F 21/78
  713/183
2009/0276788 A1* 11/2009 Homma ............. H04N 19/159
  718/107

* cited by examiner

SWITCHING METHOD, SWITCHING SYSTEM AND TERMINAL FOR SYSTEM AND/OR APPLICATION PROGRAM

CROSS-REFERENCE TO RELATED APPLICATIONS

This application is a continuation application under 35 U.S.C. 111(a) of International Application NO. PCT/CN2014/092616, filed on Nov. 29, 2014; and claims the priority of Chinese Patent Application No 201410513749.6, entitled "Switching Method, Switching System And Terminal For System And/Or Application Program" filed on Sep. 28, 2014, the entire contents of all of which are incorporated herein by reference.

TECHNICAL FIELD

The present disclosure relates to the field of terminal technologies, in particular, relates to a switching method for systems and/or application programs, a switching system for systems and/or application programs and a terminal for switching systems and/or application programs.

BACKGROUND

At present, when a user is utilizing a first system or application program, the user may receive a notification and/or event from a second system or application program, and a terminal may be switched from current operation system to the second system. After the notification and/or event is ended, the terminal will terminate the operation task of the second system or application program and directly return to the operation interface of the first system and/or application program. Additional operations are required for the user to switch to the second system and/or application program. Furthermore, when the second system is executing a notification and/or event, if the user initiatively activates other systems and/or operation programs, the terminal cannot remain at the operation interface of the system and/or application program initiatively activated by the user at the end of the notification and/or event. As a result, the switching solution of the system and/or application programs in the existing technology increases the complexity for user operation.

Therefore, that how to simply and conveniently realize an intelligent switching between multiple operation systems and/or application programs has been a technical problem to be solved.

SUMMARY

Based on at least one of the foregoing technical problems, the present disclosure provides a novel switching method for operation systems and/or application programs. Intelligent switching between multiple systems and/or application programs is realized through when it is determined that the running process of any one of operation systems and/or application programs is not ended, switching to the one of operation systems and/or application programs, when it is determined that the running processes of all operation systems and/or application programs are ended, switching to the first operation system and/or application program. Thus, the time and procedures for switching systems and/or application programs are reduced and user's experience is improved.

In view of this, the present disclosure provides a switching method for systems and/or application programs. The method, applied to a terminal, includes: receiving a notification and/or event from a second system and/or application program during the operation process of a first system and/or application program, and then switching to the second system and/or application program; when it is determined that the notification and/or event is ended, judging whether running processes of all of systems and/or application programs in the second system and/or application program are ended; when it is determined that the running process of any one of systems and/or application programs is not ended, switching to the one of systems and/or application programs, when it is determined that the running processes of all systems and/or applications are ended, switching to the first system and/or application program.

In the present technical solution, Intelligent switching between multiple systems and/or application programs is realized through when it is determined that the running process of any one of operation systems and/or application programs is not ended, switching to the one of operation systems and/or application programs, when it is determined that the running processes of all operation systems and/or applications are ended, switching to the first system and/or application program. Thus, the time and procedures for switching systems and/or application programs are reduced and user's experience is improved.

In the foregoing technical solution, preferably, the specific steps of receiving a notification and/or event from a second system and/or application and then switching to the second system and/or application program includes: judging whether a password is preset for the second system and/or application program; when it is determined that a password is not preset for the second system and/or application program, switching to the second system and/or application program, when it is determined that a password is not preset for the second system and/or application program, judging whether a received password is same to the preset password, if the received password is same to the preset password, switching to the second system and/or application program.

In the present technical solution, before entering the second system and/or application program, through judging whether a password is preset for the second system and/or application program, if the password has been preset, after the inputted password is verified to be correct, the second system and/or application program is permitted to entered, thereby ensuring the switching security of the second system and/or application program, and further the security of the user information is ensured.

In the foregoing technical solution, preferably, the method further includes: when receiving an automatic end instruction fed back by the notification and/or event, and/or, detecting a user's end operation for the notification and/or event, determining that the notification and/or event is ended.

In the foregoing technical solution, preferably, if the received password is not same to the preset password, switching to the first system and/or application program.

In the present technical solution, if a password has been preset for the second system and/or application program, when the password inputted by the user is not same to the preset password, the user can only view the operation interface of the notification and/or event, while cannot to enter the second system and/or application program. Through switching to the first system and/or application program when the user can't enter the second system and/or application program caused by inputting the incorrect password, the operation of user in the first system and/or application program is not affected, and the security risk, caused by multiple password input, of the switching between systems and/or application programs is reduced, thereby reducing the possibility of the leak of user's password.

In the foregoing technical solution, preferably, the notification and/or event includes: call service, schedule reminder, application push service and short message prompt.

According to another aspect of the present disclosure, a switching system for systems and/or application programs is provided. The system, applied to a terminal, includes: a receiving unit, a switching unit and a first judging unit. The receiving unit is configured to receive a notification and/or event from a second system and/or application program during the operation process of a first system and/or application program. The switching unit is configured to switch to the second system and/or application program. The first judging unit is configured to judge whether all of systems and application programs are ended when the notification and/or event is ended. The switching unit is further configured to switch to any one of systems and/or application programs when determining that the running process of the one of systems and/or application programs is not ended. The switching unit is further configured to switch to the first system and/or application program when determining that all of systems and/or application programs are ended.

Intelligent switching between multiple systems and/or application programs is realized through when it is determined that the running process of one of system and/or application program is not ended, switching to the one of system and/or application program, when it is determined that the running processes of all of systems and/or applications are ended, switching to the first system and/or application program. Thus, the time and procedures of switching systems and/or application programs are reduced and user's experience is improved.

In the foregoing technical solution, preferably, the switching system for systems and/or application programs further includes: a second judging unit. The second judging unit is configured to judge whether a password is preset for the second system and/or application program. The switching unit is also configured to, when determining that a password is preset for the second system and/or application program, switch to the second system and/or application program. The system for switching systems and/or application programs further includes a third judging unit configured to, when determining that a password is preset for the second system and/or application program, judge whether a received password is same to the preset password. The switching unit is also configured to, if determining that the received password is same to the preset password, switch to the second system and/or application program.

In the present technical solution, before entering the second system and/or application program, judging whether a password is preset for the second system and/or application program, if the password has been preset, after the inputted password is verified to be correct, the second system and/or application program is permitted to be entered, thereby ensuring the switching security of the second system and/or application program, and further the security of the user information is ensured.

In the foregoing technical solution, preferably, the first judging unit is also configured to, when receiving an automatic end instruction fed back by the notification and/or event, and/or, detect a user's end operation for the notification and/or event, determining that the notification and/or event is ended. In the foregoing technical solution, preferably, the switching unit is also configured to switch to the first system and/or application program if the received password being not same with the preset password is determined.

In the present technical solution, if a password is preset for the second system and application program, when the password inputted by the user is not same to the preset password, the user can only view the operation interface of the notification and/or event while can't enter the second system and/or application program. The operation of user in the first system and/or application program is not affected through switching to the first system and/or application program when the user can't enter the second system and/or application program because of inputting incorrect password, and the security risk, caused by multiple password input, of the switching between systems and/or application programs is reduced, thereby reducing the possibility of the leak of a user's password.

In the forgoing technical solution, preferably, the notification and/or event includes: call service, schedule reminder, application push service and short message prompt.

According to still another aspect of the present disclosure, a non-transitory computer-readable storage medium is provided. The non-transitory computer-readable storage medium storing executable instructions that, when executed by an electronic device, cause the electronic device to:

receive a notification and/or event from a second system and/or application program during an operation process of a first system and/or application program and then switch to the second system and/or application program;

judge whether running processes of all of systems and/or application programs in the second system and/or application program are ended when it is determined that the notification and/or event are ended; and when it is determined that the running process of any one of operation systems and/or application programs in the second system and/or application program is not ended, switch to the one of operation systems and/or application programs;

when it is determined that the running processes of all operation systems and/or applications are ended, switch to the first system and/or application program.

According to still another aspect of the present disclosure, an electronic device is provided. The electronic device includes at least one processor and a memory communicably connected with the at least one processor. The memory stores instructions executable by the at least one processor, execution of the instructions by the at least one processor causes the at least one processor to:

receive a notification and/or event from a second system and/or application program during an operation process of a first system and/or application program and then switch to the second system and/or application program;

judge whether running processes of all of systems and/or application programs in the second system and/or application program are ended when it is determined that the notification and/or event are ended; and when it is determined that the running process of any one of operation systems and/or application programs in the second system and/or application program is not ended, switch to the one of operation systems and/or application programs;

when it is determined that the running processes of all operation systems and/or applications are ended, switch to the first system and/or application program.

Through the forgoing technical solutions, specifically, intelligent switching between multiple systems and/or application programs is realized through switching to any one of system and/or application program when it is determined that the running process of the one of system and/or application program is not ended, switching to the first system and/or application program when it is determined that the running processes of all of systems and/or applications are ended. Thus, the time and procedures of switching systems and/or application programs are reduced and user's experience is improved.

DETAILED DESCRIPTION

To better understand the above purpose, features and advantages of the present disclosure, the present disclosure will be described in details below in combination with accompanying drawings and specific embodiments. It should be noted that embodiments and features in the embodiments of the present disclosure can be mutually combined without conflict.

Some specific details are illustrated in the following description so as to make the present disclosure to be understood adequately. However, the embodiments can also be implemented in other ways different from those described herein. Therefore, the protection scope of the present disclosure is not limited by specific embodiments disclosed below.

Figure 1:
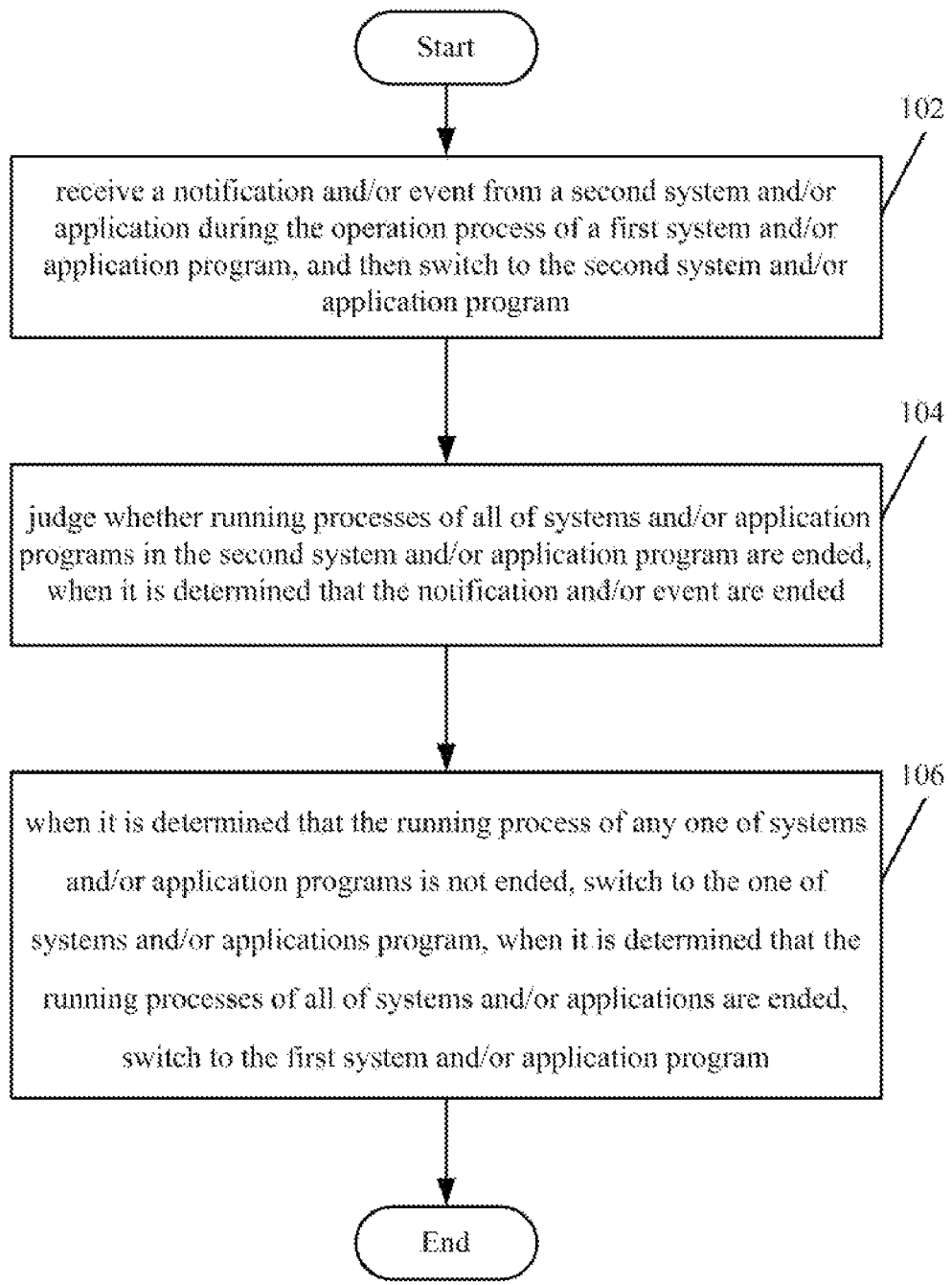
FIG. 1 is a schematic flowchart showing a switching method for systems and/or application programs according to an embodiment of the present disclosure.

FIG. 1 is a schematic flowchart showing a switching method for systems and/or application programs according to an embodiment of the present disclosure.

As illustrated in FIG. 1, according to an embodiment of the present disclosure, a switching method for systems and/or application programs includes: step 102, receiving a notification and/or event from a second system and/or application during an operation process of a first system and/or application program, and then switching to the second system and/or application program; step 104, judging whether running processes of all systems and/or application programs in the second system and/or application program are ended when it is determined that the notification and/or event is ended; a step 106, when it is determined that the running process of any one of systems and/or application programs is not ended, switching to the one of systems and/or application programs, when it is determined that the running processes of all of systems and/or applications are ended, switching to the first system and/or application program.

In the present technical solution, intelligent switching between multiple systems and/or application programs is realized through switching to any one of operation systems and/or application programs when it is determined that the running process of the one of operation systems and/or application programs is not ended, or switching to the first operation system and/or application program when it is determined that the running processes of all of operation systems and/or applications are ended. Thus, the time and procedures for switching systems and/or application programs are reduced and user's experience is improved.

In the foregoing technical solution, preferably, the specific steps of receiving a notification and/or event from a second system and/or application and then switching to the second system and/or application program include: judging whether a password is preset for the second system and/or application program; when it is determined that a password is not preset for the second system and/or application program, switching to the second system and/or application program, when it determined that a password is preset for the second system and/or application program, judging whether a received password is same to the preset password, if the received password is same to the preset password, switching to the second system and/or application program.

In the present technical solution, before entering the second system and/or application program, judging whether a password is preset for the second system and/or application program, if a password has been preset, after the inputted password is verified to be correct, the second system and/or application program is permitted to be entered, thereby ensuring the switching security of the second system and/or application program, and further the security of the user information is ensured.

In the foregoing technical solution, preferably, the method further includes: when receiving an automatic end instruction fed back by the notification and/or event, and/or, detecting the user's end operation on the notification and/or event, determining that the notification and/or event is ended. In the foregoing technical solution, preferably, if the received password is not same to the preset password, switching to the first system and/or application program.

In the present technical solution, if a password is preset for the second system and/or application program, when the password inputted by the user is not same to the preset password, the user can only view the operation interface of the notification and/or event while can't enter the second system and/or application program. Through switching to the first system and/or application program when the user can't enter the second system and/or application program caused by inputting incorrect password, the operation of user in the first system and/or application program is not affected, and the security risk, caused by multiple password input, of the switching between systems and/or application programs is reduced, thereby reducing the possibility of the leak of a user's password.

In the foregoing technical solution, preferably, the notification and/or event include: call service, schedule reminder, application push service and short message prompt.

Figure 2:
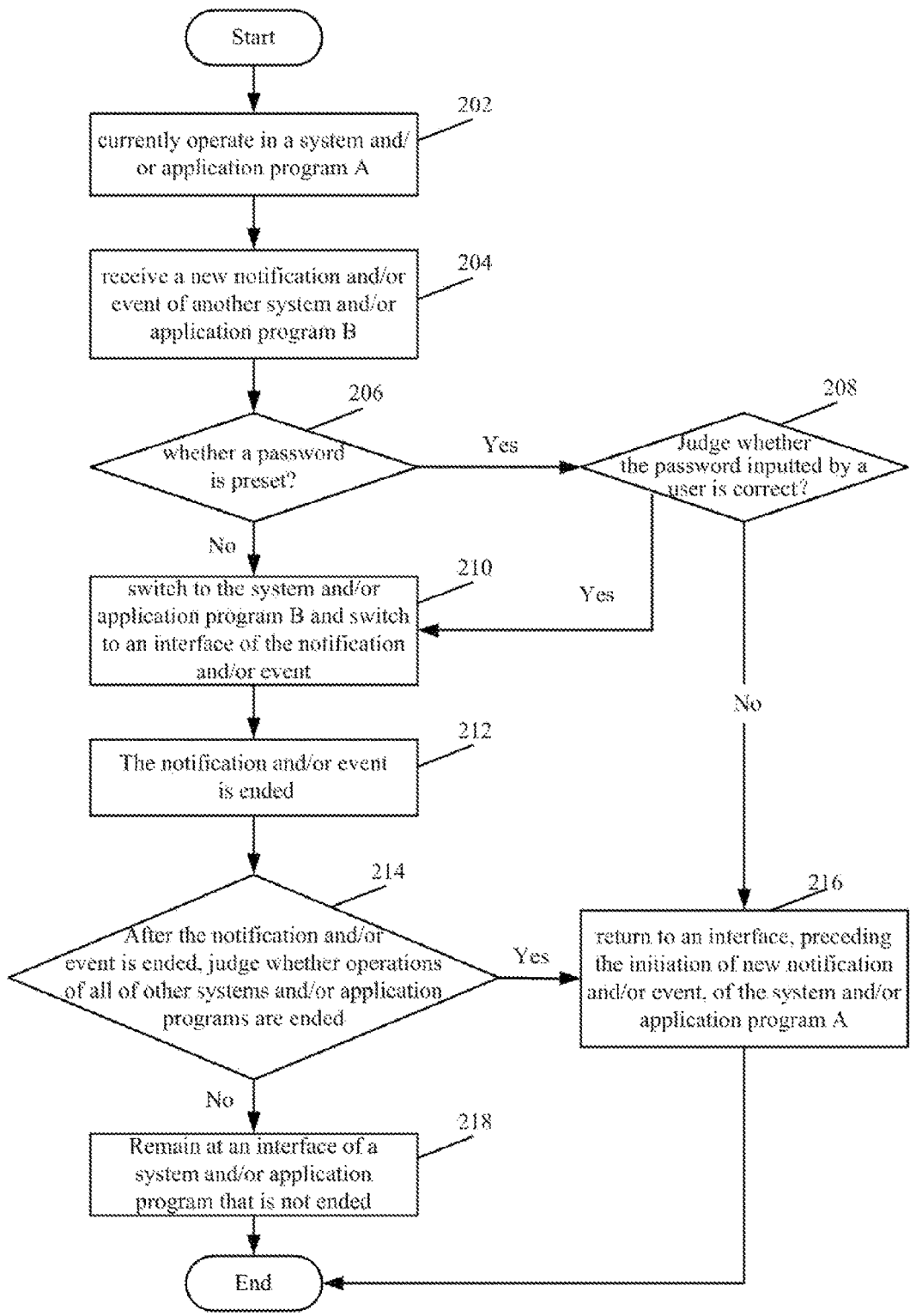
FIG. 2 is a schematic flowchart showing a switching method for systems and/or application programs according to another embodiment of the present disclosure.

FIG. 2 is a schematic flowchart showing a switching method for systems and/or application programs according to another embodiment of the present disclosure. The specific steps are as follows:

In step 202, at present, a terminal is operated in a system and/or application program A;

In step 204, a new notification and/or event of another system and/or application program B is received.

In step 206, it is judged whether a password is preset. If it is determined that a password is preset, step 208 is executed. If it is determined that no password is preset, the step 210 is executed.

In step 208, it is judged whether inputted password is correct. If it is determined that the inputted password is correct, the step 210 is executed. If it is determined that the inputted password is not correct, the step 216 is executed.

In step 210, the terminal enters the system and/or application program B, and is automatically switched to an interface of the notification and/or event.

In step 212, the notification and/or event are ended.

In step 214, it is judged whether operations of other systems and/or application programs are ended after the notification and/or event is ended. If all of other systems and/or application programs are ended, the step 216 is executed, and if one of other systems and/or application programs is operating, the step 218 is executed.

In step 216, the terminal returns to an interface of the system and/or application program A preceding the initiation of new notification and/or event.

In step 218, the terminal remains at an interface of a system and/or application program that is not ended.

The foregoing switching solution for systems and/or application programs will be further described in detail in combination with FIG. 2. When a user remains at a system A, the user may receive a new notification and/or event (such as a new call or schedule reminder) of another system B. Firstly, it is judged whether a password is required to enter the system B. If a password is required, an interface for inputting password is displayed, and after the password is inputted, the system B is entered and interface of the notification and/or event (such as interface of incoming call or interface of schedule reminder) is displayed. If a password is not required, the system A is directly switched to the system B and the interface of the notification and/or event is displayed.

In particular, the specific process of when receiving an automatic end instruction fed back by the notification and/or event and/or detecting the user's end operation to the notification and/or event and determining that the notification and/or event is ended is:

The notification and/or event may be initiatively ended by the user (for example, the user initiatively ends a call or a schedule reminder). Likewise, the system notification and/or application program can be automatically ended (for example, the schedule reminder comes to an end due to schedule reminder time is reached), or the notification and/or event may be ended by another user (for example, the call initiator hangs up the telephone). As a result, before the notification and/or event are ended, the user may remain at the interface of the notification and/or event, also may remain at another interface (for example, during a call the user may let the call run in the background and operate other application).

When the notification and/or event are ended, it is judged what state of the interface remains at before the end of notification and/or event. If it remains at the reminder interface of event and/or notification before the notification and/or event is ended, the interface, preceding the initiation of new notification and/or event, of the system and/or application program A is returned (for example, the user may be watching video in system A before an incoming call), the user can continue original operation (watching video). If it does not remains at the reminder interface of event and/or notification before the notification and/or event is ended (for example, the use may let a call run in the background and view the records of the notepad in system B), the terminal will remain at the current interface of system B after the event and/or notification is ended.

In addition, it should be particularly noted, regarding the switching process for systems and/or application programs of a terminal with multiple systems, a system A represents a first system according to embodiments of the present disclosure (namely, the original system preceding the user viewing the notification and/or event); a system B represents a second system according to embodiments of the present disclosure (namely, one of the multiple systems excluding the original system). Consequently, the switching process between the first system and the second system should be understood as: under the control of the switching method for system according to the present disclosure, a switching process between the original system and any of other systems excluding the original system.

Similarly, the switching process between multiple application programs according to embodiments of the present disclosure should be understood as: under the control of the switching method for systems according to the present disclosure, a switching process between the original application program and any of other application programs excluding the original application program.

Specifically, the present technical solutions may include following application scenarios: regarding the switching process between systems and/or application programs of a terminal with multiple systems, current system and/or application program A received a new notification and/or event in another system and/or application program B, after a password is verified to be correct, the current system and/or application program A is switched to another system and/or application program B. When it is determined that the notification and/or event is ended, information configured to prompt switching systems and/or application programs is popped-up. The information for prompting switching systems and/or application programs includes the system and/or application program A, and another system and/or application program C excluding system and/or application program A. The information for prompting switching systems and/or application programs may be displayed in a list form so as to facilitate a user to select. When the user selects the system and/or application program C, system and/or application program B is switched to system and/or application program C.

Figure 3:
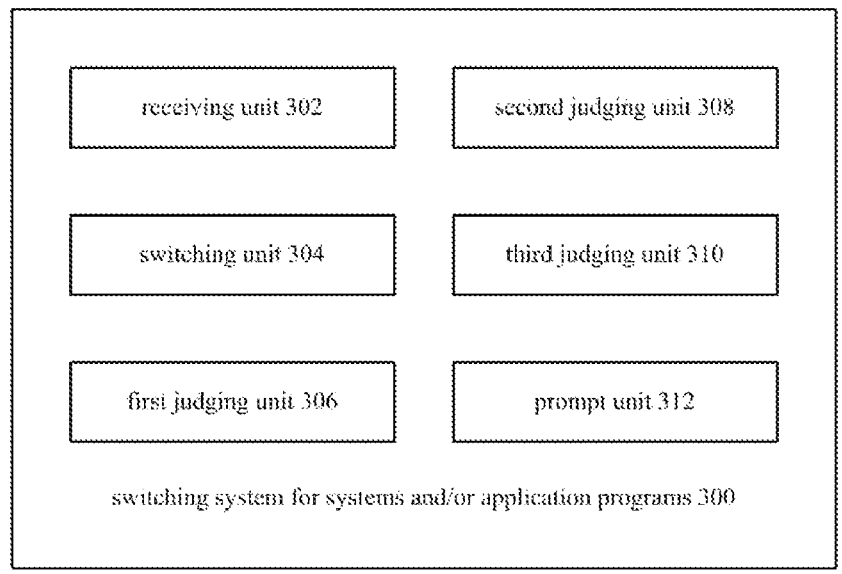
FIG. 3 is a schematic block diagram showing a switching system for systems and/or application programs according to an embodiment of the present disclosure.

FIG. 3 is a schematic block diagram showing a system for switching systems and/or application programs according to an embodiment of the present disclosure.

As illustrated in FIG. 3, a switching system for systems and application programs according to an embodiment of the present disclosure includes: a receiving unit 302, a switching unit 304 and a first judging unit 306. The receiving unit 302 is configured to receive a notification and/or event from a second system and/or application program, during the operation process of a first system and/or application program. The switching unit 304 is configured to switch to the second system and/or application program. The first judging unit 306 is configured to judge whether all of systems and application programs in the second system and/or application program are ended, when the notification and/or event is ended. The switching unit 304 is further configured to switch to the one of systems and/or application programs when determining that one of systems and/or application programs is not ended. The switching unit 304 is further configured to switch to the first system and/or application program when determining that all of systems and/or application programs are ended.

Intelligent switching between multiple systems and/or application programs is realized through switching to the one of system and/or application program when it is determined that the running process of one of system and/or application program are not ended, or switching to the first system and/or application program when it is determined that the running processes of all of systems and/or applications are ended. Thus, the time and procedures of switching systems and/or application programs are reduced and user's experience is improved.

In the foregoing technical solution, preferably, the switching system for systems and/or application programs further includes: a second judging unit 308. The second judging unit 308 is configured to judge whether a password is preset for the second system and/or application program. The switching unit 304 is also configured to switch to the second system and/or application program when determining that a password is preset for the second system and/or application program. The switching system for operation systems and/or application programs further includes a third judging unit 310, which is configured to judge whether a received password is same to a preset password when determining that a password is preset for the second system and/or application program. The switching unit 304 is also configured to switch to the second system and/or application program if determining that the received password is same to the preset password.

In the present technical solution, judging whether a password is preset for the second system and/or application program, if a password has been preset before entering the second system and/or application program, after the inputted password is verified to be correct, the second system and/or application program is permitted to be entered, thereby ensuring the switching security of the second system and/or application program, further the security of the user information is ensured.

In the foregoing technical solution, preferably, the first judging unit 306 is also configured to determine that the notification and/or event is ended when receiving an automatic shut instruction fed back by the notification and/or event and/or detecting the user's shut operation to the notification and/or event.

In the foregoing technical solution, preferably, the switching unit 304 is also configured to switch to the first system and/or application program if determining that the received password is not same to the preset password.

In the present technical solution, if a password is preset for the second system and application program, the user can only view the operation interface of the notification and/or event, and can't enter the second system and/or application program when the password inputted by the user is not same to the preset password. When the user can't enter the second system and/or application program caused by inputting incorrect password, through switching to the first system and/or application program, the operation of user in the first system and/or application program is not affected, and the security risk, caused by multiple password input, of the switching between systems and/or application programs is reduced, thereby reducing the possibility of the leak of the user's password.

In the forgoing technical solution, preferably, the notification and/or event include: call service, schedule reminder, application push service and short message prompt.

An embodiment of the present disclosure provides a non-transitory storage medium having computer executable instructions stored thereon, when executed by an electronic device, cause the electronic device to: receive a notification and/or event from a second system and/or application program during an operation process of a first system and/or application program and then switch to the second system and/or application program;

judge whether running processes of all of systems and/or application programs in the second system and/or application program are ended when it is determined that the notification and/or event are ended; and when it is determined that the running process of any one of operation systems and/or application programs in the second system and/or application program is not ended, switch to the one of operation systems and/or application programs;

when it is determined that the running processes of all operation systems and/or applications are ended, switch to the first system and/or application program.

Optionally, when receiving a notification and/or event from a second system and/or application and then switching to the second system and/or application program, the electronic device is caused to:

judge whether a password is preset for the second system and/or application program;

when it is determined that a password is not preset for the second system and/or application program, switch to the second system and/or application program, when it is determined that a password is preset for the second system and/or application program, judge whether a received password is same to the preset password, if the received password is same to the preset password, switch to the second system and/or application program.

Optionally, the electronic device is further caused to determine that the notification and/or event is ended after receiving an automatic end instruction fed back by the notification and/or event and/or detecting a user's end operation for the notification and/or event.

Optionally, if the received password is not same to the preset password, the electronic device is further caused to switch to the first system and/or application program.

Optionally, the notification and/or event include: call service, schedule reminder, application push service or short message prompt.

Figure 4:
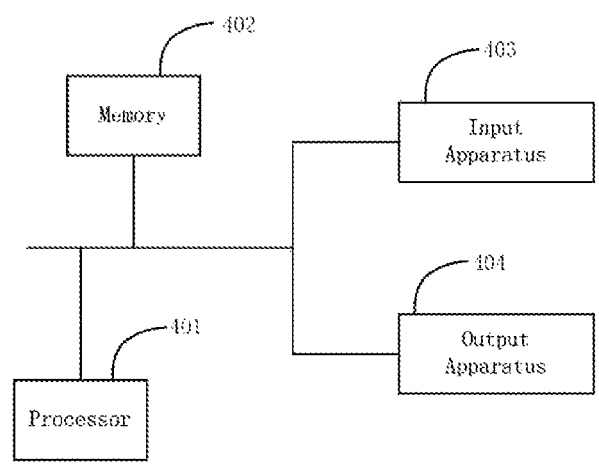
FIG. 4 is a schematic diagram of the hardware structure of an electronic device according to an embodiment of the present disclosure.

An embodiment of the present disclosure provides an electronic device. FIG. 4 is a schematic diagram of the hardware structure of the electronic device. As shown in FIG. 4, the electronic device includes: one or more processors 401 and a memory 402. FIG. 4 takes one processor 401 as an example.

The electronic device may also include an input device 403 and an output device 404.

The processor 401, the memory 402, the input device 403 and the output device 404 in the electronic device may be connected through buses or other manners. In FIG. 4, they are connected through buses, for example.

The memory 402, as a non-volatile computer readable storage medium, can be configured to store non-volatile software programs, non-volatile computer executable programs and modules, such as the program orders/modules corresponding to the switching method for systems and/or application programs. The processor 402 executes various functional applications and data processing of the server by running non-volatile software programs, instructions and modules stored in the memory 402, namely, realizing the switching method for systems and/or application programs.

The memory 402 may also include program storage region and data storage region, where the program storage region can store operating systems and application programs required by at least one function; and the data storage region can store the data created by using the switching method for systems and/or application programs. Moreover, the memory 402 can also comprise a high-speed Random Access Memory and also a non-volatile memory, such as at least one disc storage device, a flash memory device or other non-volatile solid state storage device. In some embodiments, the memory 402 optionally includes a memory located remotely relative to the processor 401.

The input device 403 may be configured to receive input digital or character information, user settings and key signal input related to the functional control. The output device 404 may include a display apparatus such as display screen, etc.

The one or more modules are stored in the memory 402. When executed by the one or more processors 401, they will implement the switching method for systems and/or application programs in any above method embodiment.

The technical solution of the present disclosure is disclosed in detail in combination with accompanying drawings. In consideration of that, how to realize intelligent switching between multiple systems and/or application programs simply and conveniently in prior art is a technical problem to be solved, the present disclosure provides a novel switching solution for systems and/or application programs. Intelligent switching between multiple systems and/or application programs is realized through switching to the one of systems and/or application programs when it is determined that the running process of one of systems and/or application programs is not ended, or switching to the first system and/or application program when it is determined that the running processes of all systems and/or applications are ended,. Thus, the time and procedures for switching systems and/or application programs are reduced and user's experience is improved.

The foregoing description provides preferred embodiments of the present disclosure and is not configured to limit the protection scope of thereof. Various other variations and modifications may be made by one skilled in the art. Any modification, equivalent substitution, or improvement made without departing from the spirit and principle of the present disclosure should be included in the protection scope of the following claims of the present disclosure.

What is claimed is:

1. A method for switching systems, comprising:
at a terminal comprising an original system and non-original systems:
receiving a notification and/or event from one of the non-original systems when the terminal is operating in the original system, and then switching to the one of the non-original systems;
determining whether running processes of all of the non-original systems are ended when the notification and/or event is ended;
when it is determined that the running process of another one of the non-original systems is not ended, switching to the another one of the non-original systems; and
when it is determined that the running processes of all of the non-original systems are ended, switching to the original system;
wherein specific steps of receiving a notification and/or event from one of the non-original systems and then switching to the one of the non-original systems comprises:
judging whether a password is preset for the one of the non-original systems;
when it is determined that a password is not preset for the one of the non-original systems, switching to the one of the non-original systems, when it is determined that a password is preset for the one of the non-original systems, judging whether a received password is same to the preset password, if the received password is same to the preset password, switching to the one of the non-original systems.

2. The method according to claim 1, further comprising:
determining that the notification and/or event is ended after receiving an automatic end instruction fed back by the notification and/or event and/or detecting a user's end operation for the notification and/or event.

3. The method according to claim 2, wherein, the notification and/or event include: call service, schedule reminder, application push service or short message prompt.

4. The method according to claim 1 wherein, if the received password is not same to the preset password, switching to the original system.

5. The method according to claim 4, wherein, the notification and/or event include: call service, schedule reminder, application push service or short message prompt.

6. The-method according to claim 1, wherein, the notification and/or event include: call service, schedule reminder, application push service or short message prompt.

7. The method according to claim 1, wherein, the notification and/or event include: call service, schedule reminder, application push service or short message prompt.

8. An electronic device, comprising:
at a memory communicably connected with the at least one processor and for storing instructions executable by the at least one processor,
wherein the electronic device has an original system and non-original systems,
wherein execution of the instructions by the at least one processor causes the at least one processor to:
receive a notification and/or event from one of the non-original systems when the terminal is operating in the original system, and then switch to the one of the non-original systems;
determine whether running processes of all of the non-original systems are ended when the notification and/or event is ended;
when it is determined that the running process of another one of the non-original systems is not ended, switch to the another one of the non-original systems; and
when it is determined that the running processes of all of the non-original systems are ended, switch to the original system;
wherein when receiving a notification and/or event from one of the non-original systems and then switching to the one of the non-original systems, the at least one processor is caused to:
judge whether a password is preset for the one of the non-original systems;
when it is determined that a password is not preset for the one of the non-original systems, switch to the one of the non-original systems, when it is determined that a password is preset for the one of the non-original systems, judge whether a received password is same to the preset password, if the received password is same to the preset password, switch to the one of the non-original systems.

9. The electronic device of claim 8, wherein the at least one processor is further caused to determine that the notification and/or event is ended after receiving an automatic end instruction fed back by the notification and/or event and/or detecting a user's end operation for the notification and/or event.

10. The electronic device of claim 8, wherein if the received password is not same to the preset password, the at least one processor is further caused to switch to the original system.

11. The electronic device of claim 8, wherein, the notification and/or event include: call service, schedule reminder, application push service or short message prompt.

12. A method for switching application programs, applied to a terminal, comprising:
receiving a notification and/or event from a second application program during an
process of a first application program, and then switching to the second application program;
determining whether a running process of a third application program is ended when the notification and/or event is ended;
when it is determined that the running process of the third application program is not ended, switching to the third application program; and
when it is determined that the running processes of the third application program is ended, switching to the original system first application program;
wherein the step of receiving a notification and/or event from a second application program during an operation process of a first application program, and then switching to the second application program comprises:
judging whether a password is preset for the second application program;
when it is determined that a password is not preset for the second application program, switching to the second application program, when it is determined that a password is preset for the second application program, judging whether a received password is same to the preset password, if the received password is same to the preset password, switching to the second application program.

13. The method of claim 12, wherein, if the received password is not same to the preset password, switching to the first application program.

14. The method of claim 12, further comprising: determining that the notification and/or event is ended after receiving an automatic end instruction fed back by the notification and/or event and/or detecting a user's end operation for the notification and/or event.

15. The method of claim 12, wherein the notification and/or event include: call service, schedule reminder, application push service or short message prompt.

* * * * *